Nov. 27, 1951 E. T. CARLSON 2,576,774
SUPPORT FOR BUS BARS IN A DUCT SYSTEM OF DISTRIBUTION
Original Filed Feb. 12, 1945 2 SHEETS—SHEET 1
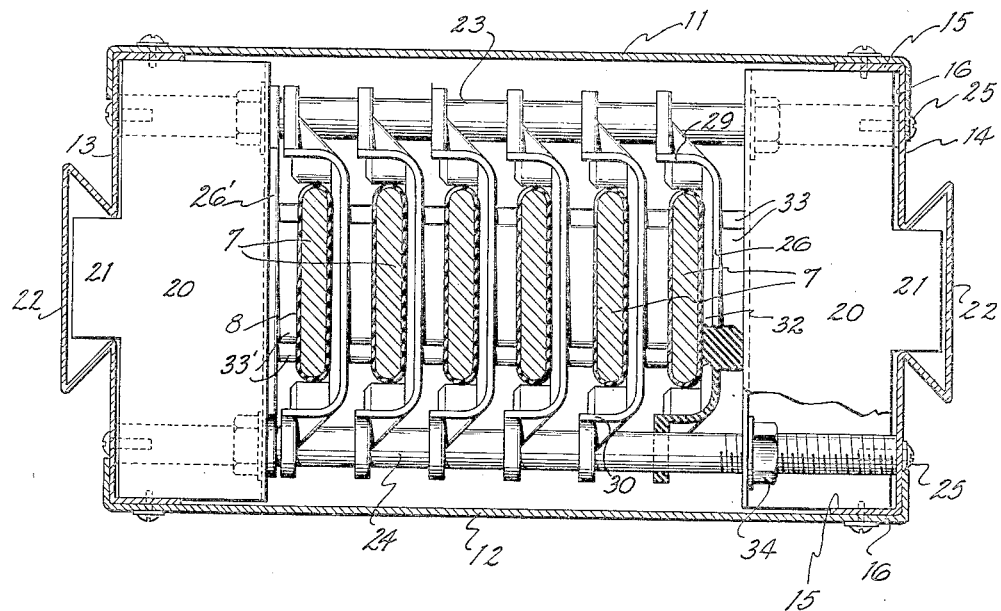
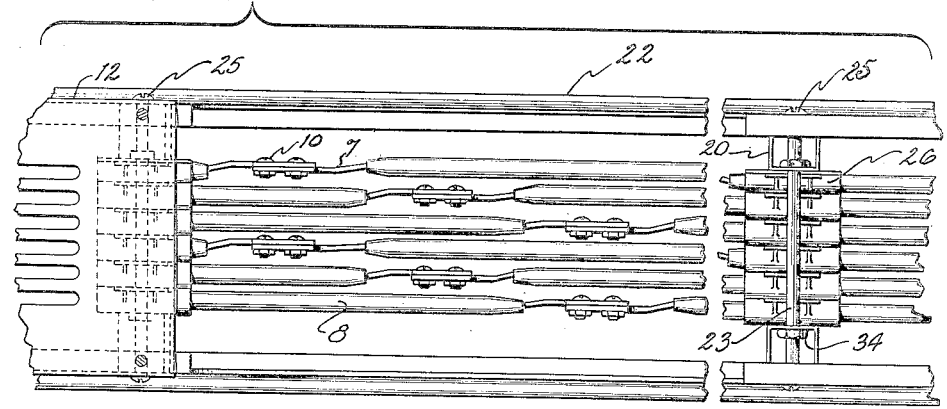
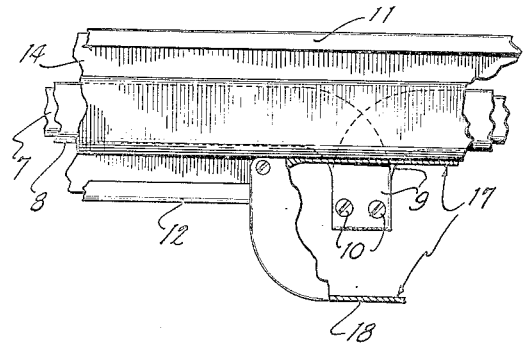
INVENTOR.
ELMER T. CARLSON
BY
ATTORNEY Nov. 27, 1951  E. T. CARLSON  2,576,774
SUPPORT FOR BUS BARS IN A DUCT SYSTEM OF DISTRIBUTION
Original Filed Feb. 12, 1945  2 SHEETS—SHEET 2
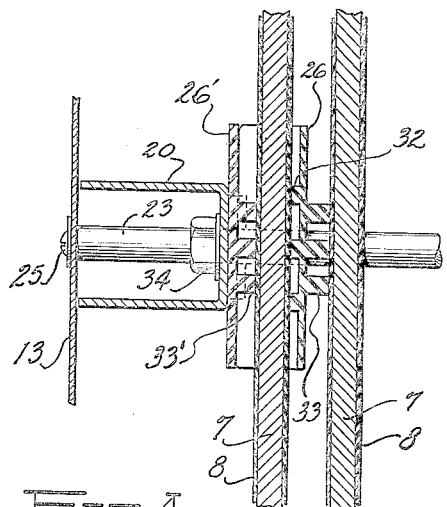
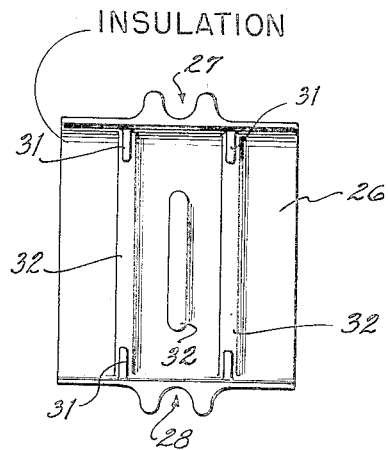
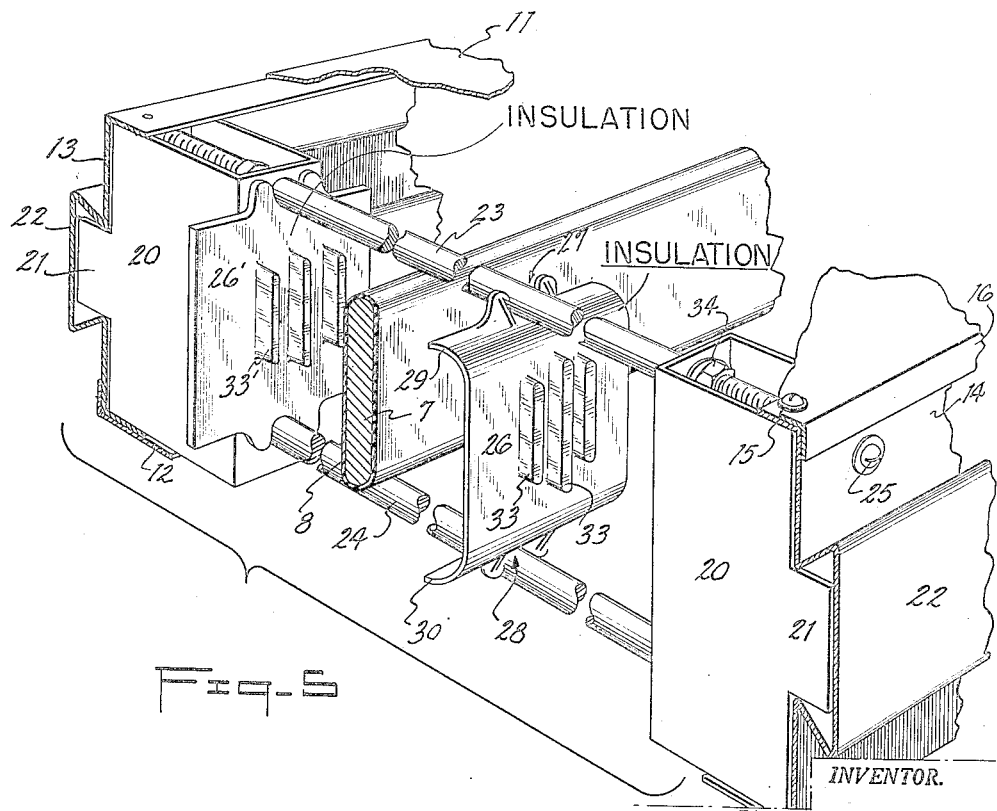
INVENTOR.
ELMER T. CARLSON
BY
ATTORNEY Patented Nov. 27, 1951

2,576,774

UNITED STATES PATENT OFFICE 2,576,774

SUPPORT FOR BUS BARS IN A DUCT SYSTEM OF DISTRIBUTION

Elmer T. Carlson, New Britain, Conn., assignor, by mesne assignments, to General Electric Company, a corporation of New York Original application February 12, 1945, Serial No. 577,500. Divided and this application December 31, 1948, Serial No. 68,638

3 Claims. (Cl. 174—99)

My invention relates particularly to bus duct systems and the means for supporting bus bars in a duct. The present application is a division from my application Serial Number 577,500 filed February 12, 1945, now Patent No. 2,468,614, dated April 26, 1949.

It is customary in such systems to make up each conductor of flat bus bar sections of suitable lengths with the ends of successive sections connected together. To make a satisfactory system it is highly desirable that the construction be compact and that each joint be easily effected, inspected and tested. It is desirable to have ample work space around the joints without unduly increasing the spacing needed between adjacent bus bars. From the standpoint of overall performance, the most satisfactory joint in a single conductor has been found to be a simple overlapping of the ends of successive sections of the bus bars and a connection effected by a bolt or bolts passing through the overlapped ends to hold them together. Unfortunately this requires that the spacing between adjacent conductors be kept fairly wide to provide adequate working space and for proper electrical clearance.

Various forms of special fittings or connectors can be and have been used such as in the Anderson Patent 2,218,016 but none meets the fullest requirements of the art. Many expedients have been tried but none is as satisfactory as the bolted type joint.

I have discovered a simple solution. Flat sectioned bus bars are arranged side by side in a group in a duct. The ends of the successive bus bar sections are bolted together but instead of being mounted in alinement the ends are bent edgewise from the general plane of the group of bus bars and project from the duct. The joined ends of the various conductors are staggered with respect to each other and covered when in use by a dome-like cover.

The invention herein claimed however is applicable also to systems in which the joints between bus bar sections are in alinement with the main lengths of the bars where it is desired to effectively support the bus bars in a duct especially where the bus bars are closely spaced for electrical, mechanical and economical reasons.

Fig. 1 is a transverse cross-sectional view of one form of bus duct system showing the preferred method of supporting the bus bars, parts being broken away.

Fig. 2 is a view on a smaller scale looking upward at a section of a duct with bus bars supported as in Fig. 1, the bottom plate or cover being omitted.

Fig. 3 is a side view of a fragment of the duct and showing a joint between the ends of two sections of a bus bar.

Fig. 4 is a fragmentary longitudinal sectional view showing the support and spacing of two bus bars.

Fig. 5 is an exploded perspective view showing parts of a duct and the means for supporting and spacing the bus bars.

Fig. 6 is a view of the inside face of one of the insulating spacing plates.

Such a system includes a suitable number of conductors 7, 7 made up of connected bus bar sections and arranged side by side in a group or bank enclosed in a duct or housing usually made up of a number of sections, each corresponding in length to the length of the bus bar section.

Each bus bar section is flat in cross section and wrapped or otherwise coated with insulation 8. The ends 9 of successive lengths of bars are preferably connected by bolts 10. Preferably the ends are bent edgewise from the general plane of the bank of bars and bent laterally slightly so that the main lengths are in alinement as shown in Fig. 2.

In the form shown, the duct is made up of upper and lower walls 11 and 12 and side walls 13 and 14 secured together in a suitable manner as for instance at the overlapping flanges 15 and 16. The lower wall is provided with an opening 17 for access to the bus bar joints and which opening is normally closed by a dome-like cover 18. The duct may contain any number of bus bars such as the bank of six in Figs. 1 and 2 where they are supported by the channel-like posts 20, 20 which have ears 21 positioned in the channels 22, 22. Cross rods 23 and 24 pass through the posts and are secured to the side plates or walls of the duct by screws 25.

Each bus bar is embraced between two insulating spacer plates. Plate 26 has notches 27 and 28 to position it on the cross rods 23 and 24, respectively. The flanges 29 and 30 extend across the edges of the bus bar and the actual contact between the inner face of the plate 26 and the bar is effected by the spaced lugs 31 at the edges of the plate and the spaced ribs 32 on the inner face of the plate. The outer face of the plate 26 has spaced ribs 33 for engaging the next adjacent bus bar or to engage the post 20 at the right. Insulating plate 26' is similarly supported on the cross rods 23 and 24 and has ribs 33' for laterally engaging the adjacent bus bar. When the parts are assembled the bus bar bank can be secured together as a unit by adjusting the nuts 34 on the rods 23 and 24.

It will thus be seen that the bus bars are adequately supported and insulated and that there are sufficient air passages between the bus bars and the supporting elements.

The vertical channel-like posts 20 connected by the transverse rods 23, 24 provide a strong construction which requires minimum weight of material for the construction of the duct and maximum facility for assembly.

I claim:

1. In a power distribution system, a duct having side walls, a plurality of parallel flat bus bars in the duct having aligned edges, pairs of channel shaped supporting members having bottom and side walls supported at intervals along the inside of the duct at the opposite sides thereof, rods connecting the bottom walls of said channel shaped members of each pair, one rod extending transversely over one set of aligned edges of the bus bars and the other rod extending transversely across the opposite set of aligned edges of said bus bars, insulating spacers on and adjustable along such rods and supporting and spacing said bus bars from each other and from the bottom walls of said channel-shaped members, nuts adjustable on said rods for clamping said channel shaped members, said bus bars and said spacers together in adjusted position, and means for securing said rods to and between the opposite side walls of the duct and drawing said side walls of the duct against the edges of the side walls of the supporting members.

2. In a power distribution system, a duct having side walls, a plurality of parallel flat bus bars in the duct having aligned edges, pairs of supporting members supported at intervals along the inside of the duct at the opposite sides of the duct, rods connecting said supporting members of each pair, one rod extending transversely across one set of aligned edges of the bus bars and the other rod extending transversely across the opposite set of aligned edges of said bus bars, insulating spacers slidable along such rods and supporting and spacing said bus bars from each other and from said supporting members, nuts adjustable on said rods for clamping said members, said bus bars and said spacers together and screws passing through the side walls of the duct for securing said rods in place within the duct and clamping the side walls of the duct against said supporting members.

3. In a power distribution system having a plurality of closely-spaced parallel flat bus bars with aligned edges, means for mutually supporting and enclosing said bus bars, comprising at spaced intervals a pair of channel-shaped posts, threaded rods connecting the upper and lower portions respectively, of said posts, insulating means positioned within the area defined by said posts and said rods, said insulating means having openings for receiving and spacing said bus bars, and notched portions for coacting with said rods so as to retain said insulating means between said posts, but to permit movement of said posts toward each other along said rods, nuts on said rods adapted to draw said posts toward each other when tightened, said posts having parallel opposed side portions, said side portions terminating substantially in a common plane with the ends of said rods, said side portions having centrally located ear portions extending beyond said common plane, side wall members attached to the ends of said rods and each having a centrally disposed channel adapted to closely surround an ear portion of said posts, and top and bottom wall members attached to said side wall members.

ELMER T. CARLSON.

REFERENCES CITED

The following references are of record in the file of this patent:

UNITED STATES PATENTS

| Number | Name | Date |
|---|---|---|
| 404,877 | Tailleur | June 11, 1889 |
| 1,936,470 | Merrill | Nov. 21, 1933 |
| 2,122,298 | Scott | June 28, 1938 |
| 2,181,664 | Melzer | Nov. 28, 1939 |
| 2,310,919 | Adam | Feb. 16, 1943 |
| 2,356,006 | Samer | Aug. 15, 1944 |